US009239377B2

(12) United States Patent
Cheng et al.

(10) Patent No.: US 9,239,377 B2
(45) Date of Patent: Jan. 19, 2016

(54) PULSE RADAR RANGING APPARATUS AND RANGING ALGORITHM THEREOF

(71) Applicant: Industrial Technology Research Institute, Hsinchu (TW)

(72) Inventors: Yu-Yi Cheng, Taipei (TW); Tien-Cheng Tseng, Hsinchu County (TW); Kuang-I Chang, Taoyuan County (TW); Jyun-Long Chen, Taoyuan County (TW); Jwu-Sheng Hu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 428 days.

(21) Appl. No.: 13/831,894

(22) Filed: Mar. 15, 2013

(65) Prior Publication Data
US 2014/0168005 A1    Jun. 19, 2014

(30) Foreign Application Priority Data

Dec. 13, 2012    (TW) .............................. 101147273 A

(51) Int. Cl.
G01S 7/28 (2006.01)
G01S 13/10 (2006.01)
G01S 7/292 (2006.01)

(52) U.S. Cl.
CPC .............. *G01S 13/103* (2013.01); *G01S 7/292* (2013.01); *G01S 7/28* (2013.01)

(58) Field of Classification Search
CPC .......... G01S 13/103; G01S 7/292; G01S 7/28
USPC ......................................... 342/135, 134, 175
See application file for complete search history.

(56) References Cited

U.S. PATENT DOCUMENTS 6,462,705 B1 * 10/2002 McEwan ...................... 342/175
6,657,583 B2    12/2003 Okamura (Continued)

FOREIGN PATENT DOCUMENTS

CN    101162268    4/2008
CN    101598790    8/2011

(Continued)

OTHER PUBLICATIONS

"Office Action of Taiwan Counterpart Application", issued on Sep. 1, 2014, p. 1-p. 6.

(Continued)

*Primary Examiner* — John B Sotomayor
(74) *Attorney, Agent, or Firm* — Jianq Chyun IP Office

(57) ABSTRACT

A pulse radar ranging apparatus and a ranging algorithm thereof are provided. The pulse radar ranging apparatus includes a radio frequency pulse generator, a radio frequency filter, a radio frequency switch and a transceiver aerial. The radio frequency pulse generator generates a pulse signal. The radio frequency filter receives the pulse signal and generates a high-pass filter signal, wherein the high-pass filter signal includes a radio frequency pulse reference signal. The radio frequency switch controls an output of the radio frequency pulse reference signal. The transceiver aerial transmits the radio frequency pulse reference signal. The radio frequency pulse reference signal contacts an object and generates a return signal, and the transceiver aerial receives the return signal. The ranging algorithm processes and analyzes the signals obtained by the pulse radar ranging apparatus, and calculates a distance between pulse radar ranging apparatus and the object by using polynomial interpolation.

17 Claims, 5 Drawing Sheets

(56) References Cited

U.S. PATENT DOCUMENTS

| | | | |
|---|---|---|---|
| 7,280,069 B2 | 10/2007 | Honya et al. | |
| 7,589,665 B2 | 9/2009 | Heide et al. | |
| 7,983,802 B2 | 7/2011 | Breed | |
| 8,489,666 B1* | 7/2013 | Nikitin | 708/819 |
| 2008/0007449 A1 | 1/2008 | Focke | |
| 2013/0272527 A1* | 10/2013 | Oomen et al. | 381/17 |
| 2014/0111367 A1* | 4/2014 | Kishigami et al. | 342/21 |
| 2014/0168005 A1* | 6/2014 | Cheng et al. | 342/135 |
| 2014/0307248 A1* | 10/2014 | Giger et al. | 356/5.01 |

FOREIGN PATENT DOCUMENTS

| | | | |
|---|---|---|---|
| GB | 1470452 A | * | 4/1977 |
| JP | H02196982 | | 8/1990 |
| JP | H04286980 | | 10/1992 |
| JP | H05180926 | | 7/1993 |
| JP | H05281344 | | 10/1993 |
| JP | 2001174542 | | 6/2001 |
| JP | 2002082162 | | 3/2002 |
| JP | 2003156556 | | 5/2003 |
| JP | 2005195554 | | 7/2005 |
| JP | 2005521067 | | 7/2005 |
| JP | 2006194802 | | 7/2006 |
| JP | 2006250777 | | 9/2006 |
| JP | 2007101390 | | 4/2007 |
| JP | 2008219824 | | 9/2008 |
| JP | 2009147568 | | 7/2009 |
| JP | 2012122960 | | 6/2012 |
| TW | 200424823 | | 11/2004 |
| TW | 200715879 | | 4/2007 |
| TW | 201030360 | | 8/2010 |
| TW | 201142338 | | 12/2011 |

OTHER PUBLICATIONS

Maatta et al., "A High-Precision Time-to-Digital Converter for Pulsed Time-of-Flight Laser Radar Applications", IEEE Transactions on Instrumentation and Measurement, Apr. 1998, vol. 47, p. 521-p. 536.

Webster, "A Pulsed Ultrasonic Distance Measurement System based upon Phase Digitizing", IIEEE Transactions on Instrumentation and Measurement, Aug. 1994, vol. 43, p. 578-p. 582.

Hanle, "Survey of bistatic and multistatic radar", IEE Proceedings, Dec. 1986, vol. 133, p. 587-p. 595.

Alonge et al., "A Novel Method of Distance Measurement Based on Pulse Position Modulation and Synchronization of Chaotic Signals Using Ultrasonic Radar Systems", IEEE Transactions on Instrumentation and Measurement, Feb. 2009, vol. 58, p. 318-p. 329.

Brunzell, "Detection of Shallowly Buried Objects Using Impulse Radar", IEEE Transactions on Geoscience and Remote Sensing, Mar. 1999, vol. 37, p. 875-p. 886.

"Office Action of Japan Counterpart Application", issued on Apr. 8, 2014, p. 1-p. 4.

Lin, "Laser Ranging Technique and the Status Quo of Relevant Research", Optolink, Jan. 1999, vol. 19, p. 1-p. 6.

* cited by examiner

US 9,239,377 B2

PULSE RADAR RANGING APPARATUS AND RANGING ALGORITHM THEREOF

CROSS-REFERENCE TO RELATED APPLICATION

This application claims the priority benefit of Taiwan application serial no. 101147273, filed on Dec. 13, 2012. The entirety of the above-mentioned patent application is hereby incorporated by reference herein and made a part of this specification.

BACKGROUND

1. Technical Field

The disclosure relates to a ranging apparatus and a ranging algorithm thereof. Particularly, the disclosure relates to a pulse radar ranging apparatus and a ranging algorithm thereof.

2. Related Art

Along with increase of labor cost and progress of automation technology, Taiwan industries start to use automation systems for manufacturing and assembling, so as to improve human throughput and product quality. In view of a present situation, in a production process of an intelligent automation system, a fast operation speed is mainly considered. Commonly used apparatuses in the automation system include a linear guide way, a robot arm or a carrier, etc. These apparatuses may have a real-time control and response function if the movement balance evaluation is performed by measuring vibration signals. Therefore, it is an important issued in development of the intelligent automation system to accurately measure a vibration amount of the robot arm (or the carrier), so as achieve a function of precise control of the automation system.

A commonly used apparatus for measuring the vibration signal includes an accelerometer and a laser interferometer, etc., and regarding a design of the future linear guide way, the robot arm or the carrier, a feature of light loading is mainly considered. However, the accelerometer belongs to an embedded sensing device, which has more limitations in application of future intelligent automated factories. Regarding the laser interferometer, since the laser interferometer performs range measurement to obtain a vibration amount of an object according to an optical principle, such measurement method is liable to be influenced by a hot and humid environment and light sources of the factory, and affects a range measurement result.

SUMMARY

A plurality of exemplary embodiments of the disclosure provide a pulse radar ranging apparatus, in which a pulse radar related hardware structure is used, and signal processing methods of feature extraction and data analysis on time-domain waveform of a voltage signal are used to detect a distance between an object and the pulse radar ranging apparatus, and detect a tiny vibration amplitude of the object.

A plurality of exemplary embodiments of the disclosure provide a ranging algorithm adapted to a pulse radar ranging apparatus, the ranging algorithm performs processing analysis on signals obtained by the pulse radar ranging apparatus, so as to accurately detect a distance between an object and the pulse radar ranging apparatus.

A plurality of exemplary embodiments of the disclosure provide a pulse radar ranging apparatus including a radio frequency pulse generator, a radio frequency filter, a radio frequency switch and a transceiver aerial. The radio frequency pulse generator generates a pulse signal. The radio frequency filter is coupled to the radio frequency pulse generator, and receives the pulse signal and generates a high-pass filter signal, where the high-pass filter signal includes a radio frequency pulse reference signal. The radio frequency switch is coupled to the radio frequency filter, and controls an output of the radio frequency pulse reference signal. The transceiver aerial is coupled to the radio frequency switch, and transmits the radio frequency pulse reference signal that is controlled by a first digital signal. The radio frequency pulse reference signal contacts an object to generate a return signal, and the transceiver aerial receives the return signal.

A plurality of exemplary embodiments of the disclosure provide a ranging algorithm adapted to a pulse radar ranging apparatus, the ranging algorithm includes following steps. A database is created, where the database includes a plurality of parameters of a distance between the pulse radar ranging apparatus and an object, an output voltage of a mixer, and time of measuring the parameters. The parameters of the database are extracted to calculate an average data of a plurality of experiments and remove voltage signal values subjected to interference. A distance between the pulse radar ranging apparatus and the object is calculated by using polynomial interpolation.

According to the above descriptions, the disclosure provides the pulse radar ranging apparatus and the ranging algorithm, by which a distance between the object and the pulse radar ranging apparatus is accurately detected, and a tiny vibration amplitude of the object is detected.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

The disclosure provides a pulse radar ranging apparatus and a ranging algorithm thereof, by which a distance between an object and the pulse radar ranging apparatus is accurately detected, and a tiny vibration amplitude of the object is detected. A plurality of exemplary embodiments is provided below for descriptions, though the disclosure is not limited thereto.

Figure 1:
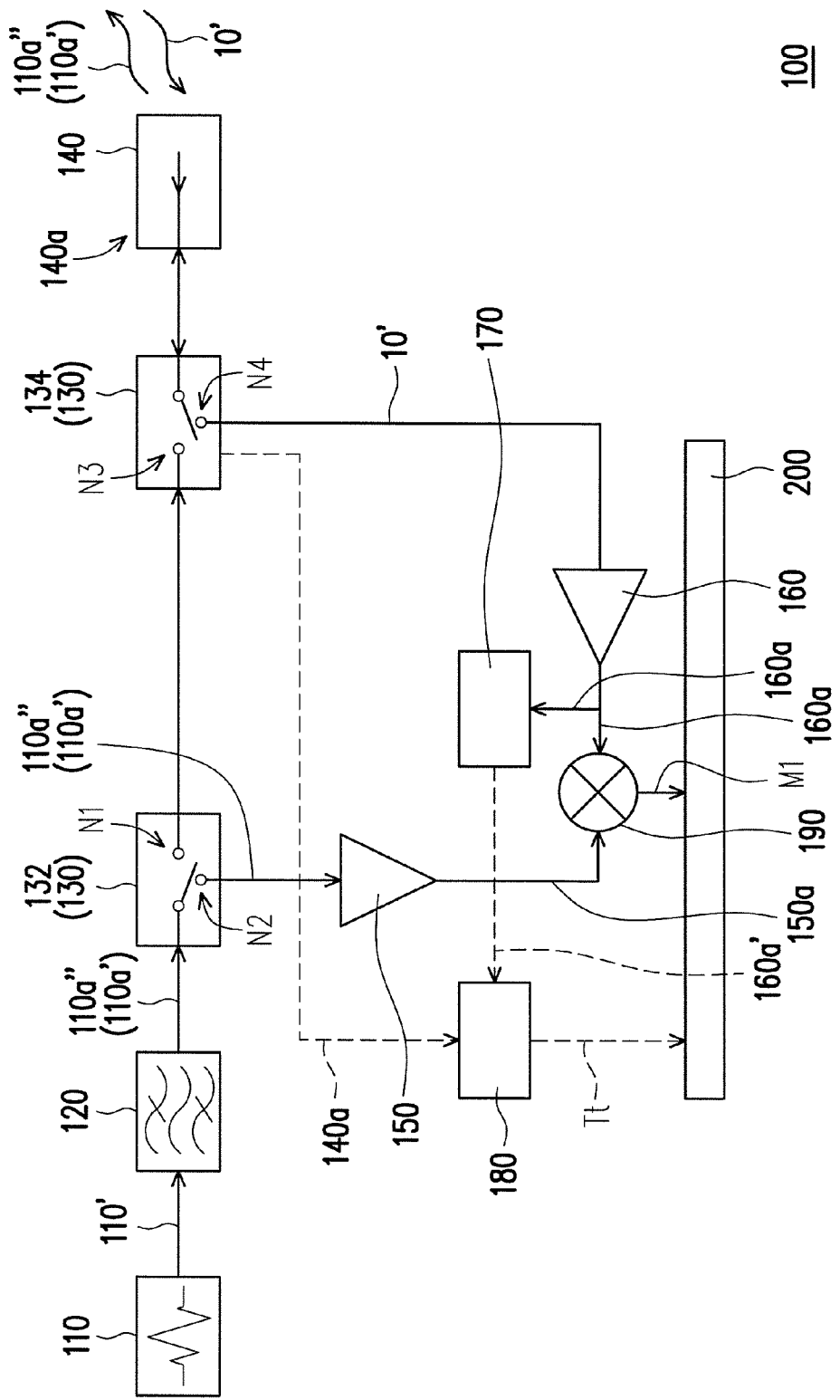
FIG. 1 is a hardware structure of a pulse radar ranging apparatus according to an exemplary embodiment of the disclosure.
Figure 2:
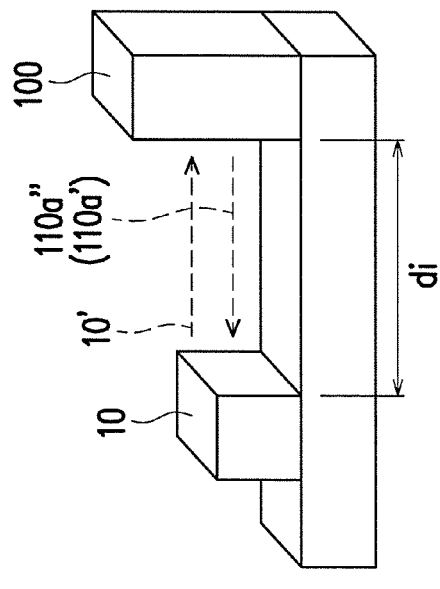
FIG. 2 is an experiment schematic diagram showing an implementation of the pulse radar ranging apparatus of FIG. 1.

FIG. 1 is a hardware structure of a pulse radar ranging apparatus according to an exemplary embodiment of the disclosure. FIG. 2 is an experiment schematic diagram of the pulse radar ranging apparatus of FIG. 1.

Referring to FIG. 1, in the present embodiment, the pulse radar ranging apparatus 100 including a radio frequency (RF) pulse generator 110, a RF filter 120, a RF switch 130 and a transceiver aerial 140. The RF pulse generator 110 is used to generate a pulse signal 110'. The RF filter 120 is coupled to the RF pulse generator 110, and receives the pulse signal 110' and generates a high-pass filter signal 110a', where the high-pass filter signal 110a' includes a RF pulse reference signal 110a". The RF switch 130 is coupled to the RF filter 120, and controls an output of the RF pulse reference signal 110a". The transceiver aerial 140 is coupled to the RF switch 130, and transmits the RF pulse reference signal 110a" that is controlled by a first digital signal 140a. The RF pulse reference signal 110a" contacts an object 10 to generate a return signal 10', and the transceiver aerial 140 receives the return signal 10'.

Generally, the pulse radar ranging apparatus 100 is, for example, radio equipment with a very high frequency, which is capable of sending directional intermittent RF pulses. In the present exemplary embodiment, the pulse radar ranging apparatus 100 can be installed on a robot arm for real-time positioning or ranging, so as to achieve a function of precise control of an automation system.

In the present exemplary embodiment, the RF generator 110 generates the pulse signal 110' with periodicity, and transmits the pulse signal 110' to the RF filter 120.

Moreover, RF filters mainly include high-pass filters and low-pass filters, and in the present exemplary embodiment, the RF filter 120 is, for example, a high-pass filter, which allows the pulse signal 110' with a high frequency to pass there through, and weakens or decreases the pulse signal 110' with a frequency lower than a cut-off frequency to pass through. Therefore, the RF filter 120 may output the high-pass filter signal 110a', where the high-pass filter signal 110a' can be regarded as the RF pulse reference signal 110a".

Then, in the present exemplary embodiment, the RF switch 130 is, for example, a wired signal switch, which is used to transfer or switch RE signals transmitted in a wired manner. The RF switch 130 includes a first RF switch 132 and a second RF switch 134, where the first RF switch 132 has endpoints N1 and N2, and the second RF switch 134 has endpoints N3 and N4.

According to the above descriptions, in the present exemplary embodiment, when the circuit of the first RF switch 132 is coupled to the endpoint N1, and the circuit of the second RF switch 134 is coupled to the endpoint N3, the RF pulse reference signal 110a" generated by the RF filter 120 can be transmitted to the transceiver aerial 140 through the first RF switch 132 and the second RF switch 134. The transceiver aerial 140 is controlled by the first digital signal 140a to transmit the RF pulse reference signal 110a".

Referring to FIG. 1 and FIG. 2, in the present embodiment, the pulse radar ranging apparatus 100 is, for example, a movable apparatus, and the object 10 is stationary. Therefore, a distance $d_t$ between the pulse radar ranging apparatus 100 and the object 10 can be adjusted according to different requirements. Conversely, the pulse radar ranging apparatus 100 can also be a stationary apparatus, and the distance $d_t$ between the pulse radar ranging apparatus 100 and the object 10 can be adjusted by moving the object 10. Therefore, when the transceiver aerial 140 transmits the RF pulse reference signal 110a", and the RF pulse reference signal 110a" contacts the object 10, the return signal 10' is generated. The reflected return signal 10' is received by the transceiver aerial 140.

Referring to FIG. 1, in the present exemplary embodiment, the pulse radar ranging apparatus 100 further includes a RF amplifier 150, a low noise amplifier 160, a RF signal processing unit 170, a counting unit 180, a mixer 190 and a signal processing device 200. When the circuit of the first RF switch 132 is coupled to the endpoint N2, the RF filter 120 is coupled to the RF amplifier 150. Therefore, the RF pulse reference signal 110a" is transmitted to the RF amplifier 150 to amplify a strength of the RF pulse reference signal 110a" to generate a first signal 150a. Moreover, when the circuit of the second RF switch 134 is coupled to the endpoint N4, the transceiver aerial 140 is coupled to the low noise amplifier 160 through the second RF switch 134. The return signal 10' reflected by the object 10 and received by the transceiver aerial 140 can be transmitted to the low noise amplifier 160 through the second RF switch 134 to amplify a strength of the return signal 10' to generate a second signal 160a.

Figure 3:
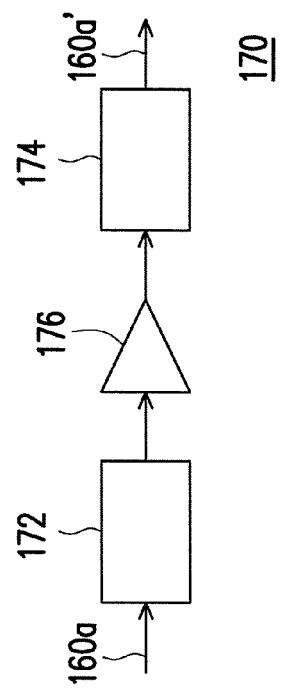
FIG. 3 is a schematic diagram showing an implementation of a hardware structure of a RF signal processing unit of the pulse radar ranging apparatus of FIG. 1.
Figure 4:
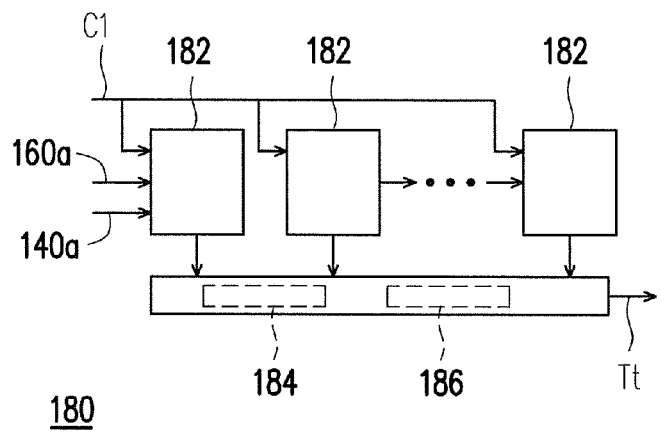
FIG. 4 is a schematic diagram showing an implementation of a hardware structure of a counting unit of the pulse radar ranging apparatus of FIG. 1.

FIG. 3 is a schematic diagram showing an implementation of a hardware structure of a RF signal processing unit of the pulse radar ranging apparatus of FIG. 1. FIG. 4 is a schematic diagram showing an implementation of a hardware structure of a counting unit of the pulse radar ranging apparatus of FIG. 1.

Referring to FIG. 3 and FIG. 1, in the present exemplary embodiment, the RF signal processing unit 170 includes a detector 172, a comparator 174 and an amplifier 176. The second signal 160a generated by the low noise amplifier 160 sequentially passes through the detector 172, the amplifier 176 and the comparator 174 and is converted into a second digital signal 160a'. Moreover, the second signal 160a and the first signal 150a can be converted by the mixer 190 to generate a vibration signal M1 with phase variation.

On the other hand, referring to FIG. 4 and FIG. 1, in the present exemplary embodiment, the counting unit 180 includes a flip-flop 182, a register 184 and a buffer 186, where the flip-flop 182 counts a pulse number of an external clock C1 input to the counting unit 180. The second digital signal 160a' generated by the RF signal processing unit 170 and the first digital signal 140a used for controlling the transceiver aerial 140 to transmit the RF pulse reference signal 110a" are respectively input to the counting unit 180, and sequentially processed by the flip-flop 182, the register 184 and the buffer 186 to detect a time difference signal Tt.

Referring to FIG. 1, in the present exemplary embodiment, the time difference signal Tt and the vibration signal M1 are respectively input to the signal processing apparatus 200, and a ranging algorithm is used to perform signal processing analysis on the time difference signal Tt and the vibration signal M1 to detect a distance between the object 10 and the pulse radar ranging apparatus 100.

Figure 5:
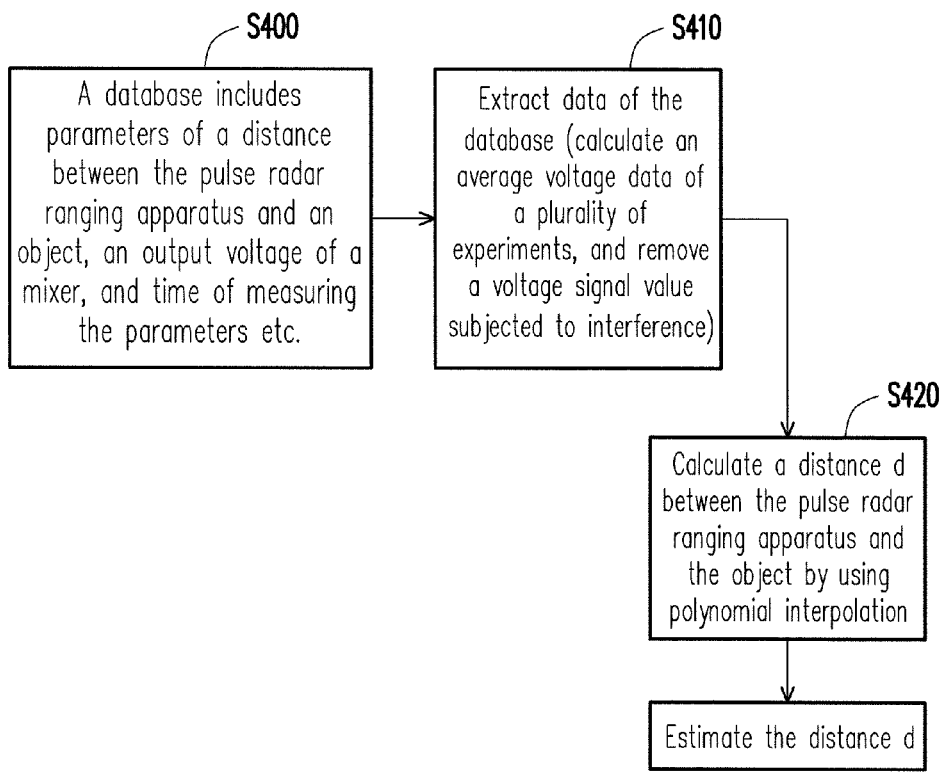
FIG. 5 is a flowchart illustrating a ranging algorithm according to an exemplary embodiment of the disclosure.
Figure 6:
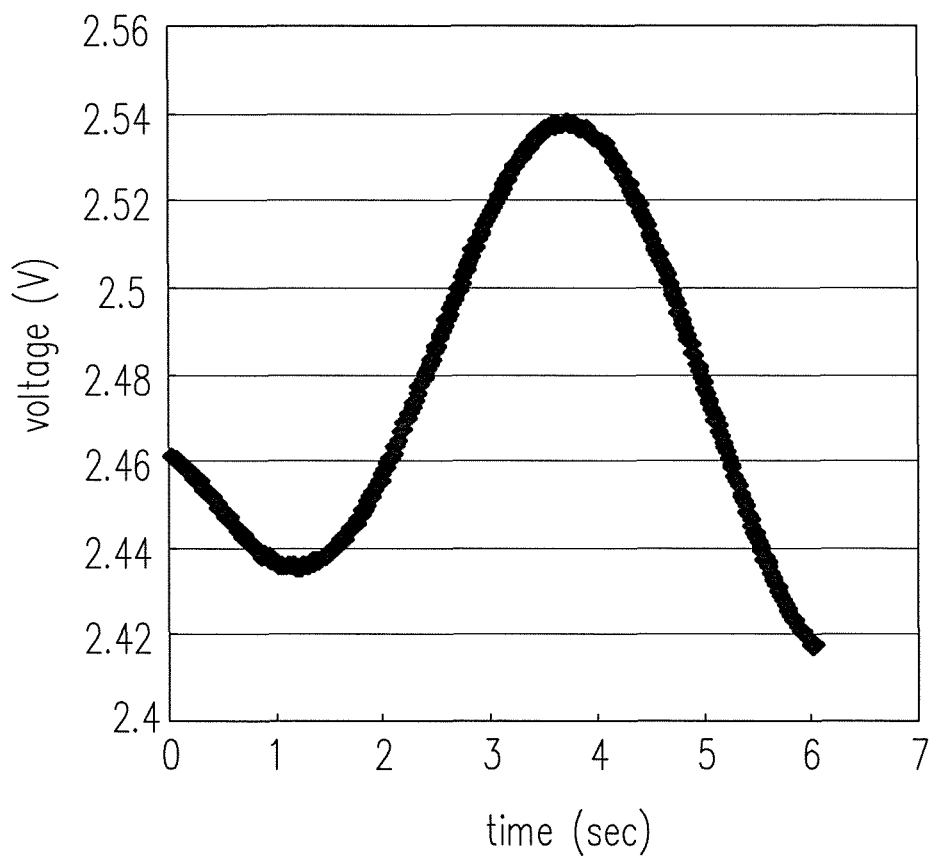
FIG. 6 is a data diagram of voltage signal extraction of a step S400 of FIG. 5.

FIG. 5 is a flowchart illustrating a ranging algorithm according to an exemplary embodiment of the disclosure. FIG. 6 is a data diagram of voltage signal extraction of a step S400 of FIG. 5.

Referring to FIG. 5, in the present exemplary embodiment, the ranging algorithm includes following steps. First, in step S400, a database is created, where the database includes parameters of a distance between the pulse radar ranging apparatus and an object, an output voltage of a mixer, and time of measuring the parameters etc. In step S410, the parameters of the database are extracted to calculate an average data of a plurality of experiments, and a voltage signal value subjected to interference is removed. Finally, in step S420, a distance between the pulse radar ranging apparatus and the object is calculated by using polynomial interpolation.

Referring to FIG. 5, FIG. 1 and FIG. 2, in the step S400, distance measurement experiment between the pulse radar ranging apparatus 100 and the object 10 is performed by M times. It is assumed that the distance between the pulse radar ranging apparatus 100 and the object 10 is $d_i$, and at a time $t_i$, the output voltage of the mixer 190 is measured to be $V_i$. After M times of the distance measurement experiment is performed, the output voltage of the mixer 190 is measured to be $\overline{V}_m$, where m=1, 2, . . . , M (shown in FIG. 6). According to voltage measurement results of the M times of experiments, it is known that at the time $t_i$, when the distance between the pulse radar ranging apparatus 100 and the object 10 is $d_i$, an equation of the output voltage $V_i$ is as follows:

$$V_i = \frac{\overline{V}_1 + \ldots + \overline{V}_M}{M} \qquad \text{equation (1)}$$

In the step S410, when the distance d is changed, the corresponding output voltage V can be measured. In this way, a variation trend of the distance d relative to the output voltage V is obtained. According to the variation trend of the measured voltage waveform, the voltage waveform can be divided into L sections. A waveform variation trend of each section can be obtained according to a slope $s_l$ of the waveform curve, so as to determine the variation trend of the distance relative to the output voltage, and an equation of the slope $s_l$ is as follows:

$$S_l = \frac{\partial V}{\partial d},$$
$$l = 1, \ldots, L \qquad \text{equation (2)}$$

According to a least-square method, a linear regression equation of each waveform segment is obtained, and the equation is as follows:

$$V' = A_l d + B_l, \; l=1, \ldots, L \qquad \text{equation (3)}$$

It is assumed that in a section l', a data sample is $\Omega = \{(d_i, V_i) | i=1, \ldots, P\}$. Since the signal is subjected to interference of ambient environment and noise influence, etc., the data sample has N batches of $(d_i, V_i)$ data, where $V_i = V_o$ (N<<P). Now, according to the N batches of data, the corresponding $V'_n$, n=1, . . . , N are obtained by using the linear regression equation (3). Then, according to a condition of a following equation (4), $V'_n$ the minimum error value and the corresponding $(d_i, V_i)$ are obtained, where the equation (4) is as follows:

$$\min \|V'_n - V_o\| \qquad \text{equation (4)}$$

In the step S420, the counting unit 180 can be used to measure a time t corresponding to the output voltage V of the mixer 190, so as to determine a voltage waveform corresponding to the time t. According to the output voltage V of the mixer 190, and the data sample $\tilde{\Omega} = \{(\tilde{d}_i, \tilde{V}_i) | i=1, \ldots, P-N-1\}$ obtained in the step S400 and the step S410, a distance d corresponding to the measurement time t is estimated by using the polynomial interpolation, for example, a piecewise cubic Hermite interpolation polynomial.

Figure 7:
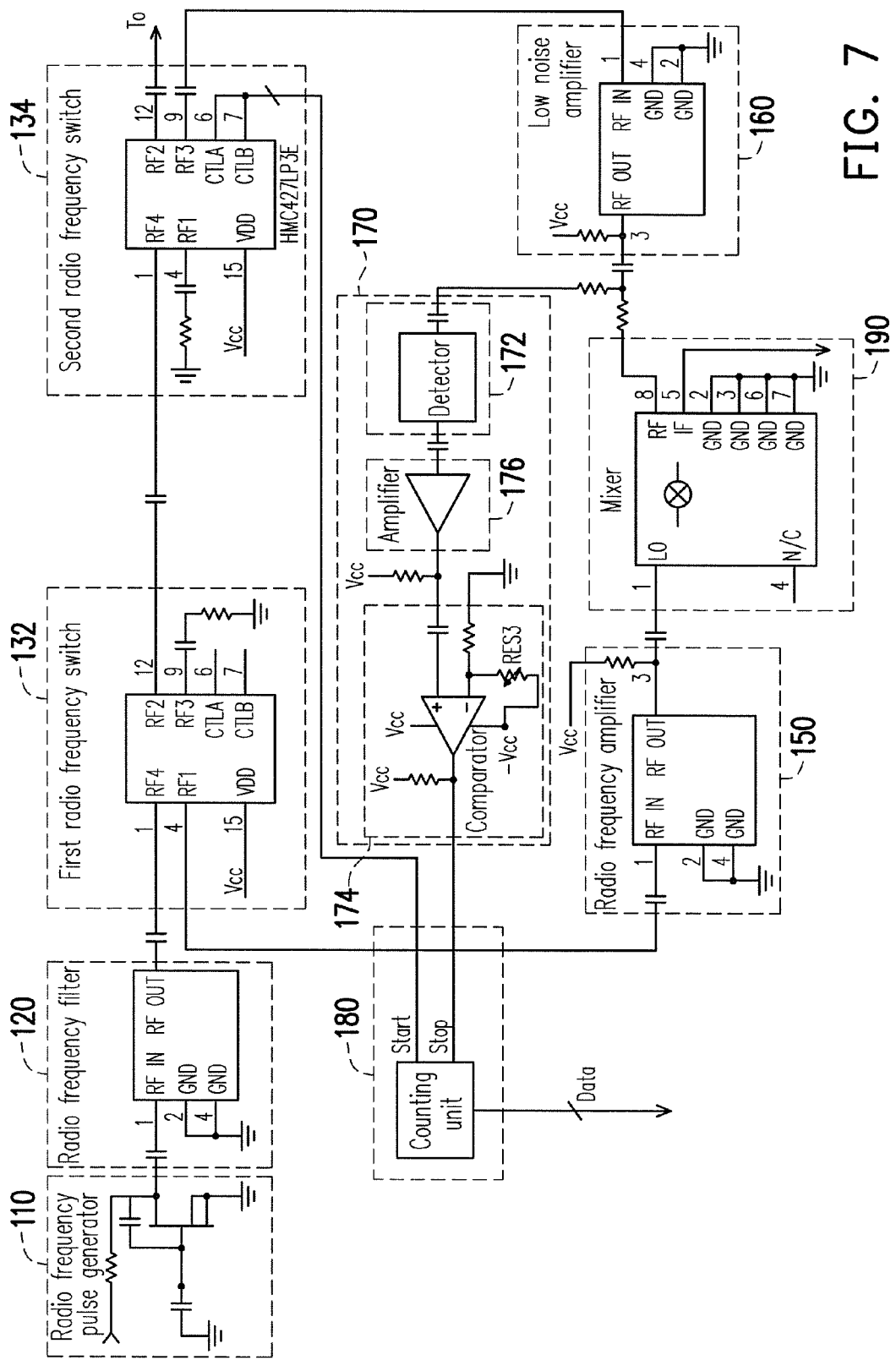
FIG. 7 is a circuit diagram of a pulse radar ranging apparatus of the disclosure.

To describe the pulse radar ranging apparatus 100 of the disclosure in detail, FIG. 7 is a circuit diagram of the pulse radar ranging apparatus 100 according to the aforementioned embodiments (FIG. 1, FIG. 3, and FIG. 4) of the disclosure, which is used to describe a circuit configuration of the pulse radar ranging apparatus 100 in detail, and is not used to limit the disclosure. It should be noticed that the same or like referential numbers denote the same or like elements, and descriptions of the same elements are not repeated.

Referring to FIG. 1 and FIG. 7, the RF pulse generator 110 is, for example, an oscillator, which is used to generate a pulse signal 110'. The RF filter 120 includes a pulse input terminal and a pulse output terminal. The pulse input terminal is adapted to receive the pulse signal 110', and the RF filter 120 filters a part of the pulse signal 110' with a low frequency, and outputs the high-pass filter signal 110a' through the pulse output terminal, where the high-pass filter signal 110a' includes the RF pulse reference signal 110a". Then, the RF pulse reference signal 110a" is transmitted to the first RF switch 132. Based on a switching control of the RF switch 130, the RF pulse reference signal 110a" can be transmitted to the second RF switch 134 and the RF amplifier 150, where the RF pulse reference signal 110a" transmitted to the second RF switch 134 is transmitted to the transceiver aerial 140 shown in FIG. 1 through the switching control of the second RF switch 134. The transceiver aerial 140 controls transmission of the RF pulse reference signal 110a" according to the first digital signal 140a, and when the RF pulse reference signal 110a" contacts the object 10 shown in FIG. 2, the return signal 10' is generated and is received by the transceiver aerial 140.

Moreover, the RF amplifier 150 receives the RF pulse reference signal 110a", and amplifies a strength of the RF pulse reference signal 110a" to generate the first signal 150a, and transmits the same to the mixer 190. On the other hand, the return signal 10' is transmitted to the low noise amplifier 160 through the switching control of the second RF switch 134, where a signal strength of the return signal 10' is amplified to generate the second signal 160a. The second signal 160a is transmitted to the RF signal processing unit 170 and the mixer 190, and in the RF signal processing unit 170, the second signal 160a is sequentially processed by the detector 172, the amplifier 176 and the comparator 174 and converted into the second digital signal 160a'. The second signal 160a and the first signal 150a can be converted by the mixer 190 to generate the vibration signal M1 with phase variation.

The second digital signal 160a' is transmitted to the counting unit 180, where the counting unit 180 includes the flip-flop 182, the register 184 and the buffer 186 shown in FIG. 4, and the flip-flop 182 counts a pulse number of the external clock C1 input to the counting unit 180. On the other hand, the first digital signal 140a used for controlling the transceiver aerial 140 to transmit the RF pulse reference signal 110a" is also input to the counting unit 180. The second digital signal 160a' and the first digital signal 140a are sequentially processed by the flip-flop 182, the register 184 and the buffer 186 of FIG. 4 to detect the time difference signal Tt.

In summary, the time difference signal Tt and the vibration signal M1 are respectively input to the signal processing device 200 shown in FIG. 1, and the ranging algorithm of the disclosure is used to perform signal processing analysis on the time difference signal Tt and the vibration signal M1, so as to accurately detect the distance between the object 10 and the RF pulse radar device 100.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A pulse radar ranging apparatus, comprising:
a radio frequency pulse generator is configured to generate a pulse signal;
a radio frequency filter coupled to the radio frequency pulse generator, is configured to receive the pulse signal to generate a high-pass filter signal, wherein the high-pass filter signal comprises a radio frequency pulse reference signal;
a radio frequency switch coupled to the radio frequency filter, is configured to control an output of the radio frequency pulse reference signal; and
a transceiver aerial coupled to the radio frequency switch, the transceiver aerial being configured to be controlled by a first digital signal to transmit the radio frequency pulse reference signal and receive a return signal.

2. The pulse radar ranging apparatus as claimed in claim 1, wherein the radio frequency switch comprises a first radio frequency switch and a second radio frequency switch, where the first radio frequency switch is coupled to the radio frequency filter, and the second radio frequency switch is coupled to the transceiver aerial.

3. The pulse radar ranging apparatus as claimed in claim 1, further comprising:
a radio frequency amplifier coupled to the first radio frequency switch, is configured to amplify the radio frequency pulse reference signal to generate a first signal;
a low noise amplifier coupled to the second radio frequency switch, is configured to amplify the return signal to generate a second signal;
a radio frequency signal processing unit coupled to the low noise amplifier, comprises a detector, an amplifier and a comparator;
a counting unit respectively coupled to the radio frequency signal processing unit and the second radio frequency switch, comprises a flip-flop, a register and a buffer;
a mixer respectively coupled to radio frequency amplifier and the low noise amplifier, is configured to receive the first signal and the second signal for converting into a vibration signal with phase variation; and
a signal processing device, coupled to the mixer and the counting unit.

4. The pulse radar ranging apparatus as claimed in claim 3, wherein the radio frequency signal processing unit converts the second signal into a second digital signal.

5. The pulse radar ranging apparatus as claimed in claim 4, wherein the second digital signal and the first digital signal are respectively input to the counting unit to detect a time difference through the counting unit, and output a time difference signal.

6. The pulse radar ranging apparatus as claimed in claim 5, wherein the flip-flop is used to count a number of pulses input to the counting unit.

7. The pulse radar ranging apparatus as claimed in claim 5, wherein the time difference signal and the vibration signal are respectively input to the signal processing device, and a ranging algorithm is used to perform signal processing analysis on the time difference signal and the vibration signal.

8. A ranging algorithm, adapted to a pulse radar ranging apparatus, the ranging algorithm comprising:
creating a database comprising a plurality of parameters, wherein the parameters comprises at least a distance between the pulse radar ranging apparatus and an object, an output voltage of a mixer and a measurement time;
extracting the parameters of the database to calculate an average voltage data from the extracted parameters and remove voltage signal values subjected to interference; and
calculating a distance between the pulse radar ranging apparatus and the object by using polynomial interpolation.

9. The ranging algorithm as claimed in claim 8, wherein the step of extracting the parameters of the database comprises:
determining a variation trend of the output voltage and the distance according to variation of a voltage waveform;
obtaining a linear regression equation of a waveform segment according to a least-square method; and
removing the voltage subjected to external interference or noise influence according to the linear regression equation.

10. The ranging algorithm as claimed in claim 9, wherein the step of calculating the distance between the pulse radar ranging apparatus and the object by using polynomial interpolation comprises:
measuring the measurement time corresponding to the output voltage by using the counting unit; and
estimating the distance corresponding to the measurement time through the polynomial interpolation by using the output voltage and a signal sample obtained after the data extraction step.

11. The ranging algorithm as claimed in claim 8, wherein the pulse radar ranging apparatus comprises:
a radio frequency pulse generator is configured to generate a pulse signal;
a radio frequency filter coupled to the radio frequency pulse generator, is configured to receive the pulse signal to generate a high-pass filter signal, wherein the high-pass filter signal comprises a radio frequency pulse reference signal;
a radio frequency switch coupled to the radio frequency filter, is configured to control an output of the radio frequency pulse reference signal; and
a transceiver aerial coupled to the radio frequency switch, is configured to transmit the radio frequency pulse reference signal that is controlled by a first digital signal, wherein the ratio frequency pulse reference signal contacts the object to generate a return signal, and the transceiver aerial receives the return signal.

12. The ranging algorithm as claimed in claim 11, wherein the radio frequency switch has a first radio frequency switch and a second radio frequency switch, the first radio frequency switch is coupled to the radio frequency filter, and the second radio frequency switch is coupled to the transceiver aerial.

13. The ranging algorithm as claimed in claim 8, wherein the pulse radar ranging apparatus further comprises:
a radio frequency amplifier coupled to the first radio frequency switch, is configured to amplify the radio frequency pulse reference signal to generate a first signal;
a low noise amplifier coupled to the second radio frequency switch, is configured to amplify the return signal to generate a second signal;
a radio frequency signal processing unit coupled to the low noise amplifier, comprises a detector, an amplifier and a comparator;
a counting unit respectively coupled to the radio frequency signal processing unit and the second radio frequency switch, comprises a flip-flop, a register and a buffer;
a mixer respectively coupled to the radio frequency amplifier and the low noise amplifier, is configured to receive the first signal and the second signal for converting into a vibration signal with phase variation; and a signal processing device, coupled to the mixer and the counting unit.

14. The ranging algorithm as claimed in claim 13, wherein the radio frequency signal processing unit converts the second signal into a second digital signal.

15. The ranging algorithm as claimed in claim 14, wherein the second digital signal and the first digital signal are respectively input to the counting unit to detect a time difference through the counting unit and output a time difference signal.

16. The ranging algorithm as claimed in claim 14, wherein the flip-flop is used to count a number of pulses input to the counting unit.

17. The ranging algorithm as claimed in claim 14, wherein the time difference signal and the vibration signal are respectively input to the signal processing device, and a ranging algorithm is used to perform signal processing analysis on the time difference signal and the vibration signal.

* * * * *